United States Patent
Palaikis et al.

(10) Patent No.: US 9,758,676 B2
(45) Date of Patent: Sep. 12, 2017

(54) NON-AQUEOUS LIQUID CONCENTRATE FOR AQUEOUS DISPERSION

(71) Applicant: EARTHCLEAN CORPORATION, South St. Paul, MN (US)

(72) Inventors: Liana Victoria Palaikis, Woodbury, MN (US); Robert Glade Bowman, Woodbury, MN (US); Olaf Christian Moberg, New Brighton, MN (US); Anthony Robert Nelson, Cottage Grove, MN (US); William Arthur Hendrickson, Woodbury, MN (US); Christopher John Rueb, St. Paul, MN (US); Neng Xiong, St. Paul, MN (US); Kerstin Kristina Iverson, Richfield, MN (US)

(73) Assignee: EarthClean Corporation, South Saint Paul, MN (US)

( * ) Notice: Subject to any disclaimer, the term of this patent is extended or adjusted under 35 U.S.C. 154(b) by 77 days.

(21) Appl. No.: 14/349,750

(22) PCT Filed: Oct. 5, 2012

(86) PCT No.: PCT/US2012/058857
§ 371 (c)(1),
(2) Date: Apr. 4, 2014

(87) PCT Pub. No.: WO2013/055579
PCT Pub. Date: Apr. 18, 2013

(65) Prior Publication Data
US 2014/0323619 A1     Oct. 30, 2014

Related U.S. Application Data

(60) Provisional application No. 61/543,574, filed on Oct. 5, 2011, provisional application No. 61/642,110, filed on May 3, 2012.

(51) Int. Cl.
*C08L 91/00* (2006.01)
*C09K 21/14* (2006.01)
*A62D 1/00* (2006.01)

(52) U.S. Cl.
CPC .............. *C08L 91/00* (2013.01); *A62D 1/005* (2013.01); *A62D 1/0028* (2013.01); *A62D 1/0064* (2013.01); *C09K 21/14* (2013.01)

(58) Field of Classification Search
CPC ................................ C08L 91/00; C08K 21/14
USPC ........................................................ 524/52
See application file for complete search history.

(56) References Cited

U.S. PATENT DOCUMENTS

2009/0232887 A1*   9/2009   Odidi et al. .................. 424/457
2011/0073794 A1    3/2011   Hagquist

FOREIGN PATENT DOCUMENTS

WO    2006/042064    4/2006
WO    2012/009270    1/2012

OTHER PUBLICATIONS

PCT International Search Report for International Application No. PCT/US2012/058857 filed Oct. 5, 2012 (10 pages).

* cited by examiner

*Primary Examiner* — Deve E Valdez
(74) *Attorney, Agent, or Firm* — Mark J. DiPietro; Karrie G. Weaver; Fred C. Morgan

(57) ABSTRACT

A non-aqueous liquid concentrate includes starch, an acrylic acid homopolymer salt, vegetable oil, and clay. The non-aqueous liquid concentrate forms an aqueous dispersion when added to water and is capable of clinging to a surface.

5 Claims, 1 Drawing Sheet

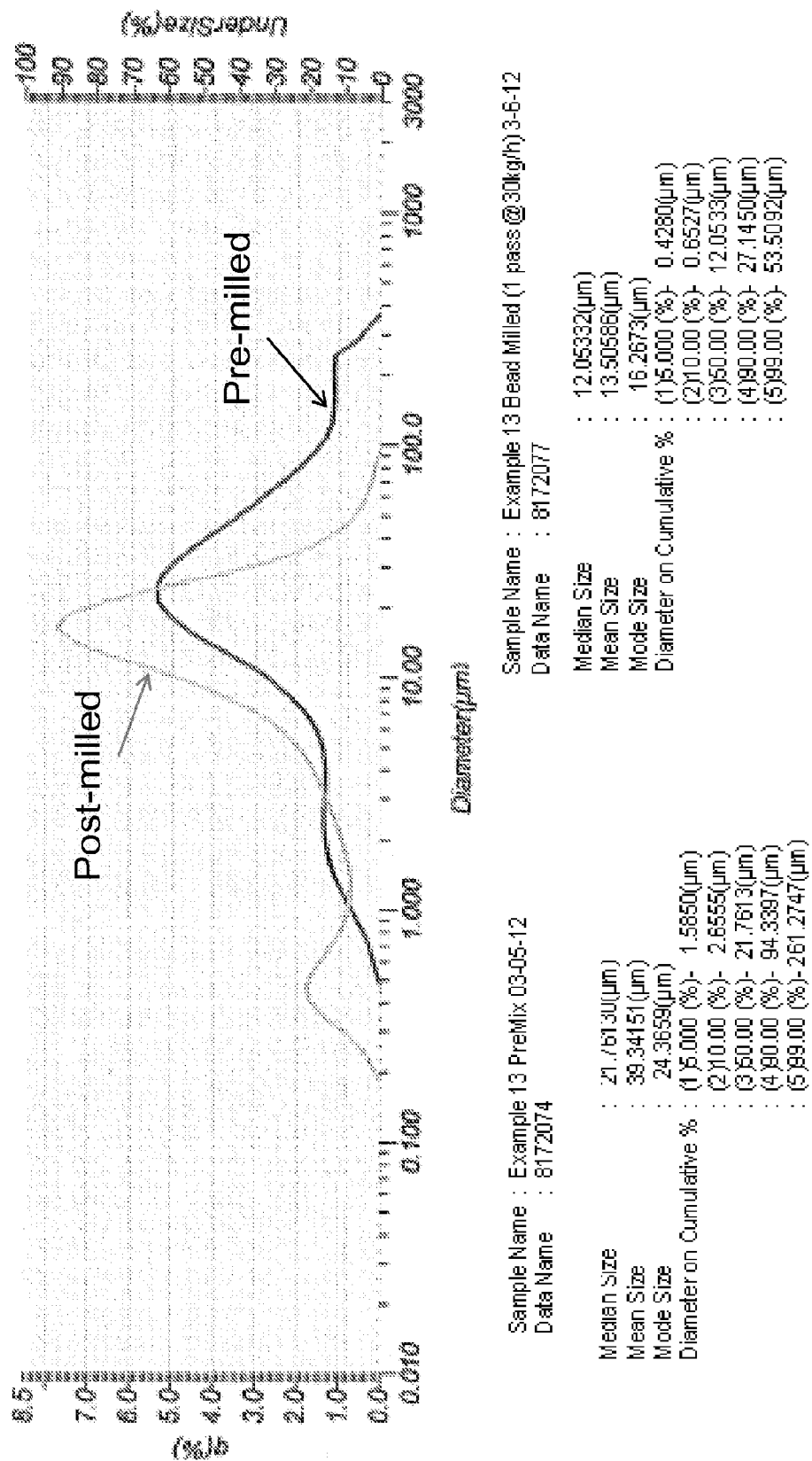

NON-AQUEOUS LIQUID CONCENTRATE FOR AQUEOUS DISPERSION

This application is a U.S. National Stage Application of International Application No. PCT/US2012/058857, filed Oct. 5, 2012, which was published in English on Apr. 18, 2013 as International Patent Publication WO 2013/055579 A1, which application is hereby incorporated by reference in its entirety, and which claims the benefit under 35 U.S.C. 119(e) of U.S. Provisional Application No. 61/543,574, filed Oct. 5, 2011 and U.S. Provisional Application No. 61/642,110, filed Mar. 3, 2012.

BACKGROUND

Aqueous dispersions are generally known in industry to be useful for a number of applications. These applications include use as a carrier for active ingredients or for coating substrates. The physical properties of the aqueous dispersion dictate the useful applications of the aqueous dispersion.

Recently aqueous dispersions have been utilized to suppress fire. Aqueous dispersions that are currently utilized to suppress fire can be difficult to formulate and may not exhibit stability. In addition some of these aqueous dispersions or precursors thereof can be corrosive or have a pH that is not neutral. Many of these aqueous dispersions require a pH modifier such strong alkalis such as hydroxides or amines, in order to achieve a thickening effect in aqueous dispersions needed to coat a substrate. In addition, a problem to overcome for chemical retardant formulations and aqueous dispersions in general, is the environmental impact of these formulations. Environmentally friendly and pH neutral formulations are desired.

BRIEF SUMMARY

The present disclosure relates to non-aqueous liquid concentrates. In particular the present disclosure relates to a non-aqueous liquid concentrate that may have shear thinning properties and that when added to water forms a dispersion having shear thinning properties. The dispersion can be pH neutral and cling to a surface and be useful for any number of applications.

In one illustrative embodiment, a non-aqueous liquid concentrate includes starch, an acrylic acid homopolymer salt, vegetable oil, and clay. The non-aqueous liquid concentrate forms an aqueous dispersion when added to water and the aqueous dispersion is capable of clinging to a surface.

In another illustrative embodiment, an aqueous dispersion includes water and the non-aqueous liquid concentrate that includes starch, an acrylic acid homopolymer salt, a vegetable oil and clay. The aqueous dispersion has a neutral pH, is shear thinning and thixotropic.

A further illustrative embodiment is a method that includes diluting the non-aqueous liquid concentrate with water to form the aqueous dispersion and directing the aqueous dispersion onto a substrate and the aqueous dispersion clings to the substrate. In some embodiments the aqueous dispersion suppresses a fire.

These and various other features and advantages will be apparent from a reading of the following detailed description.

DETAILED DESCRIPTION

In the following description, it is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure. Wt % is weight percent and is based on the total weight of the concentrate or aqueous dispersion.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

The term "acrylic acid homopolymer salt" refers to a carboxyvinyl homopolymer salt, or a polyacrylate homopolymer salt, or a 2-propenoic acid homopolymer salt. The salt can be any useful salt such as sodium, or potassium.

The present disclosure relates to non-aqueous liquid concentrates. In particular the present disclosure relates to a non-aqueous liquid concentrate that when added to water forms a dispersion having shear thinning properties. The dispersion can be pH neutral and cling to a surface and be useful for any number of applications. In some embodiments, the pH neutral aqueous dispersion can cling to a surface and suppress or extinguish a fire. The non-aqueous liquid concentrates can have a neutral pH and in many embodiments do not include pH modifiers such as strong alkalis such as hydroxides or amines, in order to achieve a thickening effect in aqueous dispersions (formed from the non-aqueous liquid concentrates) needed to coat a substrate. The aqueous dispersion is a dilution of a non-aqueous liquid concentrate and water. The non-aqueous liquid concentrate includes starch, an acrylic acid homopolymer salt, vegetable oil and clay. A synergistic relationship at particular wt % ranges of starch, an acrylic acid homopolymer salt, vegetable oil and clay has been discovered. The non-aqueous liquid concentrate can be utilized to form an aqueous dispersion that is used in any coating application where a shear thinning aqueous dispersion having a neutral pH that is non-caustic in either aqueous dispersion or non-aqueous liquid concentrate forms is useful, or desired. While the present disclosure is not so limited, an appreciation of various aspects of the disclosure will be gained through a discussion of the examples provided below.

In many embodiments, when diluted or dispersed into water or injected into a stream of water, the non-aqueous liquid concentrate can make up from 0.1 to 10 wt % or from 0.1 to 5 wt % of the aqueous dispersion. In some embodiments, when diluted or dispersed into water or injected into a stream of water, the non-aqueous liquid concentrate can make up from 0.5 to 3 wt % of the aqueous dispersion.

The aqueous dispersion formed by diluting the non-aqueous liquid concentrate with water can be pumped or sprayed by typical high pressure pumping equipment or by low-pressure individual tanks. The aqueous dispersion can have a "high yield value" (the force that must be applied to a fluid layer before any movement is produced), meaning it has an initial resistance to flow under stress but then is shear thinning, and when used, exhibits "cling," meaning it has the ability at rest, to return to a pseudo-plastic or thixotropic gel. The aqueous dispersion does not readily separate or settle and can be easily sprayed and thickens when it contacts a wall or ceiling surface, or any other surface. In firefighting application, for example, this gives the firefighter the ability, unlike water alone, to build thickness and hold the dispersion or aqueous gel on vertical or overhead surfaces. While not wishing to be bound to any particular theory, it is believed that both the aqueous dispersion's mass and the cling properties (cohesive and adhesive strength) allow it to act as a heat sink. This clinging to the surfaces causes the overall temperature of the surfaces to generally remain at or below the boiling point of water. The heat sink effect can maintain the temperature of the surface coated with the dispersion or aqueous gel at about 100 degree centigrade or lower until the water in the aqueous dispersion has been evaporated.

The starch, acrylic acid homopolymer salt, clay and vegetable oil can be mixed or blended utilizing a mixer, and the like, to obtain a homogenous and non-aqueous liquid concentrate composition. It has been found that these non-aqueous liquid concentrate compositions quickly form stable gels, aqueous suspensions or aqueous dispersions when combined with water. In many embodiments, the dilute dispersion or aqueous gel or suspension has a pH in the range of 6.5 to 7.5 and the aqueous gel or dilute dispersion or suspension clings to a surface positioned at nearly any orientation. The aqueous gel or dilute dispersion or suspension may form a protective char layer upon heating or fire contact.

In many embodiments the non-aqueous liquid concentrate includes starch, an acrylic acid homopolymer salt, clay, and a vegetable oil. This non-aqueous liquid concentrate forms an aqueous dispersion when added to water and clings to a surface.

In many embodiments the non-aqueous liquid concentrate includes at least 20 wt % or at least 25 wt % starch, at least 20 wt % or at least 25 wt % acrylic acid homopolymer salt, at least 40 wt % vegetable oil, and up to 5 wt % clay. In many embodiments the non-aqueous liquid concentrate includes from 20-30 wt % starch, 20-30 wt % acrylic acid homopolymer salt, 40-60 wt % vegetable oil, and 1-5 wt % clay.

The non-aqueous liquid concentrate can have any useful viscosity. In many embodiments the non-aqueous liquid concentrate is pumpable or flowable, and can be shear thinning. In many embodiments, viscosities (according to the test methods described herein) can range from 5000 to 25000 cP or from 10000 to 25000 cP or from 5000 to 15000 cP.

The non-aqueous liquid concentrate includes a vegetable oil, a vegetable oil ester, or combination thereof. Any vegetable oil or mixture of vegetable oils can be utilized in the formulations described herein. Vegetable oil is a triglyceride that can be degraded biologically. Some examples of vegetable oil are cottonseed oil; flaxseed oil; soybean oil; safflower oil; sunflower oil; corn oil; canola oil; and peanut oil. The vegetable oil can be any useful grade including food grade, partially hydrogenated, hydrogenated, or winterized grade, for example. Cottonseed oil appears to provide surprising gel formation and fire protection results, as is illustrated in the examples below. In addition, vegetable oil blends of cottonseed and soybean oil exhibited surprising reduced settling and syneresis compared to single oil formulations.

In many embodiments the non-aqueous liquid concentrate and the resulting aqueous dilution does not include a pH modifier. pH modifiers include hydroxides, amines, and other pH increasing elements. Many of these materials are corrosive by nature. Carbomers (a series of acid polymers primarily made from acrylic acid) can be found in the industry which require specific pH control with strong alkalis such as hydroxides or amines, in order to achieve a thickening effect in aqueous dispersions. Dispersions of the carbomer into solution is more complex, requiring a multi-step neutralization or pH adjustment process. Developing a non-aqueous liquid concentrate formulation that is non-corrosive, and is shear thinning and/or thixotropic in a range of water qualities, was desired.

Utilizing the acrylic acid homopolymer salt eliminate the pH modification step or the addition of corrosive or caustic materials to impart thickening. Selection and use of natural clays with select acrylic acid homopolymer salt provides the characteristics of both pseudoplasticity and thixotropy at an optimal peak viscosity, and demonstrates a unique synergy of these rheological characteristics, as illustrated in the Examples below.

Any useful starch can be used in the aqueous dispersions and precursors thereof. Examples of starches and their modifications, include corn, wheat, potato, tapioca, barley, arrowroot, rice or any combination of starches. As an aqueous starch-containing dispersion is heated, the starch will begin to swell at approximately 65 to 70 degrees centigrade, turn into an amorphous, jelly-like mass at about 150 degrees centigrade, and then as water is driven off, will decompose at approximately 230 degrees centigrade and higher, giving off steam and $CO_2$ as decomposition products. This behavior contributes to the unique characteristics of the aqueous dispersions in certain applications (e.g., fire suppression). One particularly useful unmodified corn starch is known by the trade name B20F, available from Grain Processing Corporation, Muscatine, Iowa. The non-aqueous liquid concentrate compositions contain at least 15% starch or at least 20% starch, or at least 25% starch.

The non-aqueous liquid concentrate and resulting aqueous dispersion can include an acrylic acid homopolymer salt. In many embodiments, the acrylic acid homopolymer salt is a polyacrylate homopolymer salt such as sodium polyacrylate, for example. Sodium polyacrylic acid homopolymers are effective pseudoplastic viscosity control agents or thickening agents, and suspending agents at a neutral pH. In many embodiment, an acrylic acid homopolymer salt does not require a pH modifier (e.g., sodium hydroxide, etc.,) to build viscosity. Two useful acrylic acid homopolymer salts are known by the trade names PNC 400™ and Neutragel DA™. They are neutralized homopolymers, also described as carboxyvinyl polymer sodium salts. PNC 400™ and Neutragel DA™ are commercially available from 3V Sigma, Inc., Weehawken, N.J. The non-aqueous liquid concentrate can contain at least 20 wt % acrylic acid homopolymer salt or from 20 to 30 wt % acrylic acid homopolymer salt.

The non-aqueous liquid concentrate and resulting aqueous dispersion can include clay. The clay can be included in any useful amount and can act as a suspending agent and/or thickening agent. Useful natural clays include water soluble clays derived from the smectite family. These include Bentonite (montmorillonite), Hectorite, Saponite, Sepiolite, Beidellite, Nontronite and Sauconite. The most common of these natural smectite clays exhibit an octahedral structure. Hectorite appears as a trioctahedral smectite, while montmorillonite can be referred to as a dioctahedral smectite. This refers to the structure of the metal elements in the crystal lattice. When smectite clay platelets are fully dispersed in water of low to moderate electrolyte content, they readily form an open, three-dimensional colloidal dispersion of individual clay platelets. The individual platelets are highly charged (positively on the edges and negatively on the faces) and stretch their inter-layer distances when the inter-layer cations hydrate. This colloidal structure is also commonly referred to as a 'house of cards' network that can thicken water and encourage thixotropic behavior due to hysteresis observed and measured during recovery after applying shear. These clay colloidal structures also impart the following characteristics to aqueous systems: thickening, suspension, sag control, and stability. Hectorite clays provide higher viscosity, sag control, and lower iron content as compared to bentonite clays. This is of particular importance when working with higher electrolyte-containing aqueous systems. Iron can reduce the viscosity build of synthetic polymeric thickening agents.

Commercially available hectorite clays are available under the trade designations Bentone™ MA, and Bentone™ EW NA, available from Elementis Specialities Inc., (Highstown, N.J.) for example. Commercially available sodium bentonite clays are available under the trade designations Volclay™ FD-181, available from American Celloid Company, (Hoffman Estates, Ill.) for example. Bentone™ MA and Bentone™ EW NA are natural hectorite clays that have been found to be unusually effective for building viscosity in the aqueous dispersion in addition to imparting thixotropy. The non-aqueous liquid concentrate can contain from 1 to 5% clay.

In many embodiments, when diluted or dispersed into water or injected into a stream of water, the non-aqueous liquid concentrate can make up from 0.1 to 5 wt % or from 0.1 to 3 wt % or from 0.5 to 3 wt % or from 0.5 to 2 wt % of the aqueous dispersion. The aqueous dispersion can have a neutral pH or a pH from 6.5 to 7.5 for example. This neutral pH range is exhibited without utilizing a pH modifier such as strong alkalis such as hydroxides or amines, in order to achieve a thickening effect in aqueous dispersions needed to coat a substrate. The non-aqueous liquid concentrate and the aqueous dispersion can be free of a pH modifier such as an alkali or amine.

In many embodiments, the non-aqueous liquid concentrate has a viscosity less than 15000 cP or in a range from 8000 to 13000 with a Brookfield viscometer #6 spindle at 30 rpm and a viscosity greater than 20000 cP or in a range from 20000 to 35000 with a #6 spindle at 5 rpm. In many embodiments, the non-aqueous liquid concentrate has a viscosity less than 5000 cP or in a range from 4000 to 5000 with a Brookfield viscometer #4 spindle at 30 rpm and a viscosity greater than 9000 cP or in a range from 9000 to 13000 with a #4 spindle at 5 rpm.

In many embodiments, a 1% wt gel formed from the non-aqueous liquid concentrate has a viscosity less than 8500 cP or in a range from 7000 to 8500 with a Brookfield viscometer #5 spindle at 30 rpm and a viscosity greater than 35000 cP or in a range from 35000 to 40000 with a #5 spindle at 5 rpm.

The aqueous dispersion, described above, can be formed without a pH modifier such as strong alkalis such as hydroxides or amines, for example. Excluding a pH modifier like sodium hydroxide, for example, in the non-aqueous liquid concentrate and resulting aqueous dispersion reduces the corrosivity of the non-aqueous liquid concentrate and aqueous dispersion.

The size distribution has been found to affect the physical properties of the non-aqueous liquid concentrate and resulting aqueous dispersions. For example, FIG. 1 illustrates a non-aqueous liquid concentrate before and after size reduction via milling or mixing. The post-milled concentrate has a D99 of about 53 micrometers and the pre-milled concentrate has a D99 of about 261 micrometers. D99 is the smallest particle diameter that is larger than 99 vol % of particles in the distribution. FIG. 1 is a graph of pre-milled and post-milled non-aqueous concentrates particle size distribution curve for Example 13 below. FIG. 1 illustrates that the D99 of the pre-milled concentrate is about 261 micrometers and the post-milled concentrate is about 54 micrometers.

Applicants have found that the non-aqueous liquid concentrate and resulting aqueous dispersions possess surprising properties when the D99 is less than about 100 micrometers, or less than 50 micrometers, or greater than 25 micrometers, or greater than 30 micrometers. In many embodiments the concentrate or resulting aqueous dispersion has a D99 in a range of about 25 to 100 micrometers or in a range from about 30 to 50 micrometers. D99 values less than this range produces concentrates that are too viscous to easily inject or mix with water and concentrates with a D99 above this range do not gel as quickly and do not possess other desirable physical attributes.

The non-aqueous liquid concentrate and resulting aqueous dispersions produced in the Examples discussed herein exhibit "shear thinning" or "pseudoplastic" and "thixotropic" character, which means the aqueous dispersion becomes thin when sheared or pumped (pseudoplastic), and sag resistant (thixotropic), at rest, allowing it to cling to substrates at varying angles. The non-aqueous liquid concentrate and resulting aqueous dispersion does not separate or settle, maintaining a stable viscosity profile over an extended period of time. Selection and use of natural clays with select acrylic acid homopolymer salts and specific vegetable oils achieves the complimentary characteristics of both pseudoplasticity and thixotropy at an optimal peak viscosity, demonstrating a unique synergy between the selected materials, as illustrated in the Examples below.

EXAMPLES

Viscosity—Viscosities of the non-aqueous liquid concentrate and resulting aqueous dispersions were measured using a Brookfield Viscometer, Model RVDVE. All samples were measured at room temperature, with the viscometer set to a speed of 5 rpm, using Spindle #6. For each sample, the spindle was immersed in the liquid concentrate or aqueous dispersion and allowed to reach equilibrium for 30 seconds prior to starting the motor. Once a stable reading was displayed, the final viscosity was noted after an additional 60 seconds, and recorded in centipoise (cP). Measurements are then repeated at 30 rpm.

Burn-Through Test—Each aqueous dispersion made from the Examples was subjected to a burn test to determine a time value of when the sample aqueous dispersion loses structural integrity and no longer protects the surface from fire. A 1"×6" pine wood coupon that is uniformly coated using a Myer bar or similar apparatus with ¼ inch of sample aqueous dispersion at a particular concentration, and placed 17 cm from the tip of a propane fueled flame apparatus measuring 1800 degrees F. at the point of impingement of the coated surface. The amount of time required to burn through the test material coating and burn a 1 cm diameter scorch mark on the coupon is recorded. This test is repeated four times.

Flame Test—Each non-aqueous liquid concentrate was subjected to a flame test to assess the flammability of the material. A propane torch was used for the evaluation (Benzomatic TS4000 igniter/torch and Worthington Pro Grade Propane fuel—14.1 oz size, blue cylinder color). For each concentrate sample, a standard wood tongue depressor was dipped into the concentrate to a depth of approximately 2 inches and removed, held vertically, and exposed to a continuous flame, with the flame held approximately 5 inches from the material for 10 seconds. If the concentrate material exhibited a sustained flame after removal of the flame source, results were noted as "flammable". If the concentrate material showed no visible flame immediately after removal of the flame source, results were noted as "flame out."

Time to Gel—Each non-aqueous liquid concentrate was assessed for its ability to form a viscous gel at a 1.0% mix ratio in reverse osmosis water or deionized water. 5.0 grams of concentrate material was measured into 495.0 g of water in a 1000 ml beaker. The samples were gelled using a Kitchen Aid™ immersion blender with a variable speed dial set to the lowest speed (1). The blender was immersed in the liquid. Two gel points were noted: a) the time in seconds required for initial gel formation, described as the visual transition point between water and the first notable increase in viscosity resembling a gel, and b) additional time in seconds required for a visually homogeneous and smooth gel.

Particle Size (D99)—Dispersions and mixture Examples below were analyzed for particle size using a Horiba LA-950 laser scattering particle size analyzer. The analyzer incorporates a solvent based flow system. Since samples were received as dispersions in vegetable oil, they were analyzed using heptane as circulation bath medium. The dispersions were pre-dispersed in heptane prior to analysis by introducing 0.5 mL of the sample to 15 mL of heptane in a glass scintillation vial. The pre-dispersed sample was mixed using a vortex. The analyzer was brought to heptane from water by rinsing twice with IPA, twice with acetone, then filling with heptane. A refractive index of 1.53 was used. This is similar to that of starch (related to the main ingredient in the dispersion). The analyzer was aligned and blanked, and the pre-dispersed sample introduced to 70-85% transmittance. The sample was ultrasonicated in the analyzer for 1 minute prior to acquisition of the data. Mean diameter, D5, D10, D50, D90, and D99 data was obtained from this analysis with the software associated with the Horiba LA-950 analyzer.

The materials utilized in these Examples are described below.

PNC 400™ is an acrylic acid homopolymer sodium salt (3V Sigma, Inc., Weehawken N.J.)

Neutragel DA™ is a an acrylic acid homopolymer sodium salt (3V Sigma, Inc., Weehawken N.J.)

Bentone™ EW NA is a commercially available natural hectorite clay (Elementis Specialities Inc., Highstown, N.J.)

B20F, is a commercially available unmodified corn starch (Grain Processing Corp., Muscatine Iowa)

Soybean Oil 100 is a commercially available soybean oil (Columbus Vegetable Oils, Des Plaines, Ill.) that is clear at zero degrees centigrade.

Roundy's Vegetable Oil is a commercially available soybean oil, (Roundy's Supermarkets, Inc, Milwaukee, Wis.).

Soybean Oil 110 is a commercially available winterized soybean oil (Columbus Vegetable Oils, Des Plaines, Ill.), partially hydrogenated and winterized, high stability.

Cottonseed 300 is a commercially available cottonseed oil (Columbus Vegetable Oils, Des Plaines, Ill.) non-winterized cottonseed oil.

Cottonseed 310 is a commercially available winterized cottonseed oil (Columbus Vegetable Oils, Des Plaines, Ill.) that is clear at zero degrees centigrade.

Castor, cottonseed, flax seed, canola, rice bran, safflower and peanut oils are all commercially available from Soap Goods, Smyrna, Ga.

EXAMPLES

The concentrate Examples of Table 1 and Table 2 were prepared from the following ingredients using a FlackTek, Inc. SpeedMixer 150FVZ-K. This concentrate forms a gel when 1% of the concentrate is mixed into DI water.

TABLE 1

| Ingredient | Form | Weight % |
| --- | --- | --- |
| Neutragel DA | Powder | 25 |
| Corn Starch | Powder | 25 |
| Bentone EW-NA | Powder | 5 |
| Vegetable Oil | Liquid | 45 |
| Total | | 100 |

A number of different vegetable oils were utilized in the formulation according to Table 1. Table 2 describes the specific vegetable oil and the corresponding example identification.

TABLE 2

| Example # | Vegetable Oil |
| --- | --- |
| 1 | Soybean |
| 2 | Cottonseed |
| 3 | Castor |
| 4 | Flaxseed |
| 5 | Rice bran |
| 6 | Safflower |
| 7 | Peanut |
| 8 | Canola |
| 9 | Soybean |
| 10 | Canola |
| 11 | 50:50 Soybean/Canola |
| 12 | 50:50 Soybean/Cottonseed |

The Examples in Table 3 and Table 4 were prepared by using a bead mill mixer.

TABLE 3

| Ingredient | Form | Weight % |
| --- | --- | --- |
| Neutragel DA | Powder | 23.4 |
| Corn Starch | Powder | 23.4 |

TABLE 3-continued

| Ingredient | Form | Weight % |
|---|---|---|
| Bentone EW-NA | Powder | 4.6 |
| Vegetable Oil | Liquid | 48.6 |
| Total | | 100 |

A number of different vegetable oils (Example 13-15 in Table 4) were utilized in the formulation illustrated in Table 3. Table 4 describes the specific vegetable oil and the corresponding example identification.

TABLE 4

| Example # | Vegetable Oil |
|---|---|
| 13 | Soybean |
| 14 | Soybean 110 |
| 15 | 50:50 Cottonseed 310/Soybean |

Results

Examples 1-12 were tested for concentrate viscosity and 1% aqueous dispersion (gel) viscosity.

TABLE 5

| Example | Conc. Visc 30 RPM (cP) | Conc. Visc 5 RPM (cP) | 1% Gel Visc 30 RPM (cP) | 1% Gel Visc 5 RPM (cP) |
|---|---|---|---|---|
| 1 | 11,000 | 29,000 | 10,000 | 49,200 |
| 2 | 10,800 | 24,200 | 11,000 | 48,200 |
| 3 | — | 113,000 | 9,800 | 145,000 |
| 4 | 9,200 | 20,000 | 10,200 | 47,800 |
| 5 | 10,900 | 25,200 | 10,600 | 47,000 |
| 6 | 11,400 | 25,200 | 11,200 | 54,200 |
| 7 | 11,300 | 27,000 | 11,400 | 53,400 |
| 8 | 11,600 | 28,200 | 11,800 | 59,400 |
| 9 | 12,000 | 34,400 | 9,700 | 48,600 |
| 10 | 12,600 | 34,200 | 10,300 | 52,400 |
| 11 | 11,900 | 32,400 | 13,400 | 62,800 |
| 12 | 11,500 | 30,600 | 9,700 | 47,200 |

Examples 1-12 were tested for time to gel and time to homogenous gel to form the 1% aqueous dispersion as described above. Examples 1-12 were tested according to the burn test described above.

TABLE 6

| Example | Gel Initial (sec) | Gel Homogenous (sec) | Burn Test (sec) |
|---|---|---|---|
| 1 | 12 | 23 | 68 |
| 2 | 12 | 24 | 76 |
| 3 | 19 | 32 | 63 |
| 4 | 11 | 25 | 58 |
| 5 | 10 | 16 | 39 |
| 6 | 8 | 18 | 82 |
| 7 | 9 | 16 | 51 |
| 8 | 8 | 18 | 97 |
| 9 | 9 | 18 | 61 |
| 10 | 10 | 19 | 80 |
| 11 | 9 | 17 | 58 |
| 12 | 8 | 16 | 93 |

All of the liquid concentrate examples showed no visible flame after removal of the flame source during the flame test.

Examples 9-13 were tested as 1% gels in reverse osmosis (i.e., RO) water according to the burn test described above and the results below are an average of four tests for each example.

TABLE 7

| Example | Burn Test (sec) |
|---|---|
| 9 | 77 |
| 10 | 90 |
| 11 | 74 |
| 12 | 90 |
| 13 | 66 |

In view of the burn behavior of Example 12, Examples 12 and 13 were then tested further at 1.5% in both RO (soft) water and municipal hard water (458 mg/l $CaCO_3$) measuring viscosity and burn-through time as described above. Results below are the average of four test replicates for each example.

TABLE 8

| Example | 30 rpm | 5 rpm | Burn Time (sec) |
|---|---|---|---|
| 12 (hard water) | 8700 | 38000 | 133 |
| 13 (hard water) | 6200 | 26000 | 66 |
| 12 (soft water) | 22000 | 95000 | 210 |
| 13 (soft water) | 19000 | 82000 | 201 |

It is surprising that Example 12 provides both a higher viscosity and burn-through time as compared to Example 13. Example 12 differs from Example 13 in that the Example 12 vegetable oil is 50% cottonseed oil and 50% soybean oil and the Example 13 vegetable oil is 100% soybean oil. FIG. 1 is a particle distribution of a pre-milled and post-milled Example 13 composition. Example 13 was milled (e.g., mixed or homogenized) with a bead mixer to reduce and homogenize the composition. FIG. 1 illustrates that the D99 of the pre-milled concentrate is about 261 micrometers and the post-milled concentrate is about 54 micrometers.

The concentrate Examples of Table 9 and Table 10 were prepared from the following ingredients using a FlackTek, Inc. SpeedMixer 150FVZ-K. This concentrate forms a gel when 1% of the concentrate is mixed into DI water.

TABLE 9

| Ingredient | Form | Weight % |
|---|---|---|
| Neutragel DA | Powder | 23.4 |
| Corn Starch | Powder | 23.4 |
| Bentone EW-NA | Powder | 4.7 |
| Vegetable Oil | Liquid | 48.6 |
| Total | | 100 |

A number of different vegetable oils were utilized in the formulation according to Table 9. Table 10 describes the specific vegetable oil and the corresponding example identification.

TABLE 10

| Example # | Vegetable Oil |
|---|---|
| 14 | Soybean 100 |
| 15 | Soybean 110 |
| 16 | Cottonseed 300 |
| 17 | Cottonseed 310 |
| 18 | Soybean 100/Soybean 110-50:50 |
| 19 | Soybean 100/Cottonseed 300-50:50 |

TABLE 10-continued

| Example # | Vegetable Oil |
|---|---|
| 20 | Soybean 100/Cottonseed 310-50:50 |
| 21 | Soybean 110/Cottonseed 300-50:50 |
| 22 | Soybean 110/Cottonseed 310-50:50 |
| 23 | Cottonseed 300/Cottonseed 310-50:50 |

Concentrate samples were observed to be weakly flocculated to varying degrees. The blends of soybean and cottonseed oils exhibited the greater degree of weak flocculation ("setting up"), with little to no syneresis. Being weakly flocculated is a positive attribute with respect to ability to maintain the stability of the suspension (minimizing syneresis and sedimentation/settling). Thus it is surprising that the blends of soybean and cottonseed oils exhibited reduced syneresis and settling. Oils of same type (e.g., 100% soybean or 100% cottonseed) exhibited greatest syneresis and did not "set up".

Viscosities of the non-aqueous liquid concentrate and resulting aqueous dispersions (gels) were measured using a Brookfield Viscometer, Model RVDVE. All samples were measured at room temperature, with the viscometer set to a speed of 5 rpm, using Spindle #4 for the liquid concentrates and Spindle #5 for the gels. For each sample, the spindle was immersed in the liquid concentrate or aqueous dispersion and allowed to reach equilibrium for 30 seconds prior to starting the motor. Once a stable reading was displayed, the final viscosity was noted after an additional 60 seconds, and recorded in centipoise (cp). Measurements were then repeated after changing speed to 30 rpm and recording viscosity after 60 seconds.

TABLE 12

1.0% gel in RO water

| Example #/ trial | 1 | 2 | 3 | 4 | average | std dev |
|---|---|---|---|---|---|---|
| 14 | 50 | 53 | 52 | 45 | 50 | 3.5 |
| 15 | 52 | 54 | 48 | 44 | 49.5 | 4.4 |
| 16 | 66 | 58 | 57 | 56 | 59.25 | 4.6 |
| 17 | 52 | 54 | 46 | 43 | 48.75 | 5.1 |
| 18 | 57 | 55 | 52 | 62 | 56.5 | 4.2 |
| 19 | 71 | 58 | 50 | 38 | 54.25 | 13.9 |
| 20 | 58 | 59 | 53 | 44 | 53.5 | 6.9 |
| 21 | 41 | 67 | 72 | 49 | 57.25 | 14.7 |
| 22 | 52 | 52 | 23 | 43 | 42.5 | 13.7 |
| 23 | 49 | 42 | 46 | 18 | 38.75 | 14.1 |

TABLE 13

1.4% gel in (~230 mg/L CaCO3 hardness) water

| Example #/ trial | 1 | 2 | 3 | 4 | average | std dev |
|---|---|---|---|---|---|---|
| 14 | 51 | 52 | 22 | 62 | 46.75 | 17.2 |
| 15 | 72 | 80 | 12 | 72 | 59 | 31.5 |
| 16 | 76 | 48 | 56 | 80 | 65 | 15.4 |
| 17 | 60 | 90 | 48 | 68 | 66.5 | 17.7 |
| 18 | 53 | 72 | 48 | 69 | 60.5 | 11.8 |
| 19 | 66 | 72 | 47 | 85 | 67.5 | 15.8 |
| 20 | 55 | 66 | 58 | 36 | 53.75 | 12.7 |
| 21 | 77 | 17 | 68 | 45 | 51.75 | 26.8 |
| 22 | 58 | 55 | 41 | 52 | 51.5 | 7.4 |
| 23 | 24 | 51 | 53 | 47 | 43.75 | 13.4 |

It is noteworthy that in the presence of hard water, or water with significant ionic strength, burn-through data

TABLE 11

| Example | ECIL number | Conc. Visc 5 RPM (cP) Spindle 4 | Conc. Visc 30 RPM (cP) Spindle 4 | 1% Gel Visc 5 RPM (cP) Spindle 5 | 1% Gel Visc 30 RPM (cP) Spindle 5 | 1% Gel Visc 5 RPM (cP) 24 hr Spindle 5 | 1% Gel Visc 30 RPM (cP) 24 hr Spindle 5 |
|---|---|---|---|---|---|---|---|
| 14 | 235 | 10640 | 4273 | 36800 | 7760 | 42080 | 8670 |
| 15 | 236 | 12440 | 5060 | 36480 | 7640 | 44160 | 8950 |
| 16 | 237 | 9360 | 4207 | 37120 | 7770 | 42640 | 9070 |
| 17 | 238 | 9480 | 4140 | 37520 | 7810 | 41440 | 8400 |
| 18 | 239 | 11080 | 4487 | 38560 | 7750 | 46400 | 9790 |
| 19 | 240 | 9800 | 4127 | 38960 | 7950 | 41200 | 8450 |
| 20 | 241 | 9960 | 4180 | 39360 | 8130 | 41200 | 8530 |
| 21 | 242 | 10040 | 4133 | 38800 | 7990 | 39920 | 8480 |
| 22 | 243 | 10840 | 4460 | 39200 | 8290 | 40880 | 8370 |
| 23 | 244 | 9600 | 3993 | 36640 | 8030 | 38880 | 8120 |

The viscosities of the various gels made from the concentrates made with 50/50 soybean/cottonseed oils showed the greatest viscosity stability (little comparative viscosity build) over 24 hours, when compared to gels made from single-type oil concentrates. This is a desirable attribute when storing or using prepared gels for a period of time.

% gels in RO water and 1.4% gels in ~230 mg/L CaCO3 hardness water were prepared and tested for burn-through. Tests were run tests in replicate and burn through times (in seconds) recorded when an approx. 1 cm diameter scorch mark is observed.

suggests that blending cottonseed oil with soybean oil, regardless of grade, provides greater consistency of the gel's cohesive and adhesive strength, resulting in longer burn-through times for those gels, when compared to soybean oil only concentrate-made gels. This enhancement is not as apparent when running the burn-through test in RO water at similar gel viscosities.

All of the liquid concentrate examples showed no visible flame after removal of the flame source during the flame test.

Thus, embodiments of the NON-AQUEOUS LIQUID CONCENTRATE FOR AQUEOUS DISPERSION are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. An aqueous dispersion composition comprising; water; and a non-aqueous liquid concentrate consisting essentially of:
   starch;
   an acrylic acid homopolymer salt;
   vegetable oil; and
   up to 5 wt. % clay;
   wherein, the non-aqueous liquid concentrate forms an aqueous dispersion when added to water and is capable of clinging to a surface, each percentage based on the concentrate; and wherein the aqueous dispersion has a neutral pH, is shear thinning and thixotropic.

2. The aqueous dispersion according to claim 1 wherein the aqueous dispersion has solids concentration in a range from 0.5 to 3 wt. %.

3. A non-aqueous liquid concentrate comprising:
   starch;
   an acrylic acid homopolymer salt;
   vegetable oil; and
   clay;
   wherein, the non-aqueous liquid concentrate comprises 40-60 wt. % solids, forms an aqueous dispersion when added to water and is capable of clinging to a surface, each percentage based on the concentrate.

4. An aqueous dispersion composition comprising;
   water; and
   the non-aqueous liquid concentrate according to claim 3;
   wherein the aqueous dispersion has a neutral pH, is shear thinning and thixotropic.

5. The aqueous dispersion according to claim 4 wherein the aqueous dispersion has solids concentration in a range from 0.5 to 3 wt. %.

* * * * *